US012617627B2

(12) United States Patent
Nagel et al.

(10) Patent No.: US 12,617,627 B2
(45) Date of Patent: May 5, 2026

(54) SELECTIVELY SECURABLE ROLLER TRACK

(71) Applicant: Fasteners for Retail, Inc., Twinsburg, OH (US)

(72) Inventors: Thomas Nagel, Twinsburg, IL (US); Shane Obitts, North Ridgeville, OH (US)

(73) Assignee: Fasteners for Retail, Inc., Twinsburg, OH (US)

( * ) Notice: Subject to any disclaimer, the term of this patent is extended or adjusted under 35 U.S.C. 154(b) by 0 days.

(21) Appl. No.: 18/431,632

(22) Filed: Feb. 2, 2024

(65) Prior Publication Data

US 2024/0262633 A1    Aug. 8, 2024

Related U.S. Application Data

(60) Provisional application No. 63/483,077, filed on Feb. 3, 2023.

(51) Int. Cl.
*B65G 39/12* (2006.01)
*A47F 1/12* (2006.01)

(52) U.S. Cl.
CPC ................ *B65G 39/12* (2013.01); *A47F 1/12* (2013.01)

(58) Field of Classification Search
CPC ............. B65G 39/12; A47F 1/12; A47F 1/125
See application file for complete search history.

(56) References Cited

U.S. PATENT DOCUMENTS

| | | | | |
|---|---|---|---|---|
| 527,897 | A | 10/1894 | Stikeman | |
| 2,140,656 | A | 12/1938 | Smith | |
| 3,202,298 | A | 8/1965 | Rudolf | |
| 3,868,021 | A * | 2/1975 | Heinrich | ............ E05D 15/0682 |
| | | | | 211/184 |
| 4,519,508 | A * | 5/1985 | Gullett | ...................... A47F 1/12 |
| | | | | 211/175 |
| 4,615,276 | A * | 10/1986 | Garabedian | ............. A47F 5/005 |
| | | | | 211/184 |
| 4,682,696 | A | 7/1987 | Sheu | |
| 4,775,058 | A * | 10/1988 | Yatsko | .................... A47F 5/005 |
| | | | | 211/184 |
| 4,830,201 | A * | 5/1989 | Breslow | .................. A47F 1/126 |
| | | | | 211/59.3 |

(Continued)

FOREIGN PATENT DOCUMENTS

| | | |
|---|---|---|
| AU | 2014360687 A1 | 6/2016 |
| CN | 106073215 A | 11/2016 |

(Continued)

OTHER PUBLICATIONS

Google, "define lens", retreived Mar. 20, 2025, <https://www.google.com/search?q=define+lens> (Year: 2025).*

*Primary Examiner* — Stanton L Krycinski
(74) *Attorney, Agent, or Firm* — Honigman LLP

(57) ABSTRACT

A merchandise security system for a retail shelf includes a front rail having a base, a front wall, and a rear wall spaced apart from the front wall by a channel. The system also includes a roller track configured to engage the front rail and operable to translate along the front rail. Here, the roller track includes a plurality of rollers and a frame. The plurality of rollers are selectively engaged with the front rail.

20 Claims, 13 Drawing Sheets

(56)                    References Cited

U.S. PATENT DOCUMENTS

| | | | | |
|---|---|---|---|---|
| 5,190,186 | A * | 3/1993 | Yablans | G07F 11/60 |
| | | | | 221/124 |
| 5,217,122 | A | 6/1993 | Martinez | |
| 5,740,926 | A | 4/1998 | Mulloy | |
| 5,871,104 | A | 2/1999 | Martinez et al. | |
| 6,497,326 | B1 * | 12/2002 | Osawa | A47F 1/12 |
| | | | | 414/276 |
| 7,424,957 | B1 | 9/2008 | Luberto | |
| 7,469,791 | B2 * | 12/2008 | Phoy | A47F 5/0093 |
| | | | | 211/59.2 |
| 7,497,342 | B2 * | 3/2009 | Hardy | A47F 1/126 |
| | | | | 211/151 |
| 7,628,282 | B2 * | 12/2009 | Hardy | A47F 1/126 |
| | | | | 211/151 |
| 7,641,057 | B2 * | 1/2010 | Mueller | A47F 1/126 |
| | | | | 211/59.3 |
| 7,918,353 | B1 * | 4/2011 | Luberto | A47F 1/126 |
| | | | | 312/61 |
| 8,096,427 | B2 * | 1/2012 | Hardy | A47F 1/126 |
| | | | | 211/59.3 |
| 8,113,601 | B2 * | 2/2012 | Hardy | A47F 3/002 |
| | | | | 312/138.1 |
| 8,177,076 | B2 * | 5/2012 | Rataiczak, III | A47F 1/126 |
| | | | | 211/59.3 |
| 8,276,772 | B2 * | 10/2012 | Kim | A47F 1/12 |
| | | | | 211/151 |
| 8,376,154 | B2 * | 2/2013 | Sun | A47F 1/125 |
| | | | | 193/35 J |
| 8,573,379 | B2 * | 11/2013 | Brugmann | A47F 1/125 |
| | | | | 211/144 |
| 8,579,123 | B2 * | 11/2013 | Mueller | A47F 1/126 |
| | | | | 211/59.3 |
| 8,596,443 | B2 * | 12/2013 | Brugmann | A47F 5/0093 |
| | | | | 211/172 |
| 8,627,965 | B2 * | 1/2014 | Hardy | A47F 1/126 |
| | | | | 211/59.3 |
| D699,059 | S * | 2/2014 | Kim | D6/702 |
| 8,662,325 | B2 * | 3/2014 | Davis | A47F 5/005 |
| | | | | 211/151 |
| D705,585 | S * | 5/2014 | Kim | D6/705.7 |
| 8,739,984 | B2 * | 6/2014 | Hardy | A47F 7/0007 |
| | | | | 211/59.3 |
| 8,746,468 | B2 * | 6/2014 | Poulokefalos | A47F 5/005 |
| | | | | 211/59.3 |
| 8,752,717 | B2 * | 6/2014 | Bird | A47F 1/04 |
| | | | | 211/59.3 |
| 8,978,904 | B2 * | 3/2015 | Hardy | A47B 57/58 |
| | | | | 211/59.3 |
| 9,016,482 | B2 * | 4/2015 | Kim | A47F 1/126 |
| | | | | 211/59.2 |
| 9,038,804 | B1 * | 5/2015 | Nickell | B65G 13/11 |
| | | | | 211/151 |
| 9,060,624 | B2 * | 6/2015 | Hardy | A47F 1/126 |
| 9,070,261 | B2 * | 6/2015 | Hardy | A47F 3/002 |
| 9,173,504 | B2 * | 11/2015 | Hardy | A47B 57/585 |
| 9,220,353 | B2 * | 12/2015 | Brügmann | A47F 1/12 |
| 9,232,864 | B2 | 1/2016 | Hardy et al. | |
| 9,265,362 | B2 | 2/2016 | Hardy | |
| 9,266,678 | B2 * | 2/2016 | Nickell | B65G 13/11 |
| 9,402,485 | B2 | 8/2016 | Hardy et al. | |
| 9,486,088 | B2 | 11/2016 | Hardy et al. | |
| 9,538,860 | B2 * | 1/2017 | Brej | A47F 1/126 |
| 9,750,354 | B2 | 9/2017 | Hardy | |
| 9,770,121 | B2 * | 9/2017 | Walker | A47F 7/28 |
| 9,782,017 | B1 * | 10/2017 | Luberto | A47F 1/125 |
| 9,820,584 | B2 | 11/2017 | Hardy | |
| 9,955,802 | B2 * | 5/2018 | Bird | A47F 7/28 |
| 10,064,500 | B2 * | 9/2018 | Furui | A47F 1/12 |
| 10,154,739 | B2 | 12/2018 | Turner et al. | |
| 10,159,359 | B2 * | 12/2018 | Borg | B65G 1/023 |
| 10,165,871 | B2 | 1/2019 | Hardy | |
| 10,172,481 | B2 | 1/2019 | Walker et al. | |
| 10,251,493 | B2 * | 4/2019 | Kim | B65G 1/023 |
| 10,260,545 | B2 * | 4/2019 | Obitts | A47B 57/58 |
| 10,334,949 | B2 * | 7/2019 | Leinonen | A47B 57/585 |
| 10,441,094 | B2 * | 10/2019 | Kim | B65G 1/026 |
| 10,588,426 | B2 * | 3/2020 | Bird | A47F 1/125 |
| 10,709,032 | B1 | 7/2020 | Holyoake et al. | |
| 10,952,546 | B2 * | 3/2021 | Hardy | A47F 5/005 |
| 10,959,540 | B2 * | 3/2021 | Padvoiskis | A47B 57/586 |
| 11,026,525 | B2 | 6/2021 | Barzee | |
| 11,045,017 | B2 * | 6/2021 | Padvoiskis | A47F 1/00 |
| 11,064,816 | B2 * | 7/2021 | Sun | A47B 57/406 |
| 11,097,798 | B1 | 8/2021 | McDowell et al. | |
| 11,254,505 | B2 * | 2/2022 | Sun | B65G 39/02 |
| 11,259,652 | B2 * | 3/2022 | Hardy | A47F 1/12 |
| 11,375,826 | B2 * | 7/2022 | Hardy | A47B 73/006 |
| 11,484,131 | B2 * | 11/2022 | Hardy | A47F 1/04 |
| 11,490,743 | B2 * | 11/2022 | Hardy | A47F 5/0025 |
| 11,583,108 | B2 * | 2/2023 | Hardy | A47B 65/10 |
| 11,583,109 | B2 * | 2/2023 | Hardy | A47F 5/0068 |
| 11,774,170 | B2 | 10/2023 | Kang et al. | |
| 11,832,737 | B2 * | 12/2023 | Ewing | A47F 5/005 |
| 11,910,918 | B2 * | 2/2024 | Walker | A47F 5/005 |
| 2004/0245197 | A1 * | 12/2004 | McElvaney | A47F 5/005 |
| | | | | 211/59.3 |
| 2010/0133214 | A1 * | 6/2010 | Evans | A47F 1/12 |
| | | | | 211/49.1 |
| 2010/0206829 | A1 * | 8/2010 | Clements | A47F 1/12 |
| | | | | 211/184 |
| 2011/0139736 | A1 * | 6/2011 | Hardy | A47F 1/04 |
| | | | | 211/59.3 |
| 2013/0270204 | A1 * | 10/2013 | Bird | A47F 1/04 |
| | | | | 211/49.1 |
| 2014/0263134 | A1 * | 9/2014 | Walker | A47B 57/58 |
| | | | | 211/184 |
| 2014/0299560 | A1 * | 10/2014 | Kim | A47F 1/126 |
| | | | | 211/59.2 |
| 2017/0164765 | A1 | 6/2017 | Young | |
| 2017/0245659 | A1 | 8/2017 | Hardy | |
| 2018/0140113 | A1 | 5/2018 | Hardy et al. | |
| 2019/0261786 | A1 | 8/2019 | Mercier et al. | |
| 2020/0128992 | A1 | 4/2020 | Mountford et al. | |
| 2020/0214472 | A1 | 7/2020 | Nagel et al. | |
| 2021/0059434 | A1 | 3/2021 | Ciesick | |
| 2021/0307538 | A1 | 10/2021 | Hardy | |
| 2021/0307539 | A1 | 10/2021 | Hardy | |
| 2021/0321793 | A1 | 10/2021 | Hardy et al. | |
| 2021/0321794 | A1 * | 10/2021 | Hardy | A47F 3/002 |
| 2022/0000282 | A1 | 1/2022 | Hardy | |
| 2022/0039563 | A1 | 2/2022 | Peters | |
| 2022/0218123 | A1 | 7/2022 | Hardy | |
| 2022/0265041 | A1 * | 8/2022 | Walker | A47B 57/585 |
| 2022/0279941 | A1 | 9/2022 | Bird et al. | |
| 2023/0294924 | A1 | 9/2023 | Mook et al. | |
| 2024/0023727 | A1 | 1/2024 | Nagel et al. | |
| 2024/0172880 | A1 * | 5/2024 | Bruegmann | A47F 1/12 |

FOREIGN PATENT DOCUMENTS

| | | |
|---|---|---|
| CN | 107259811 A | 10/2017 |
| CN | 107928156 A | 4/2018 |
| CN | 108175192 A | 6/2018 |
| CN | 108260961 A | 7/2018 |
| CN | 108813998 A | 11/2018 |
| CN | 108814000 A | 11/2018 |
| CN | 108835944 A | 11/2018 |
| CN | 110326905 A | 10/2019 |
| CN | 110772055 A | 2/2020 |
| CN | 111184354 A | 5/2020 |
| CN | 111358191 A | 7/2020 |
| CN | 111700403 A | 9/2020 |
| CN | 111743318 A | 10/2020 |
| CN | 112056802 A | 12/2020 |
| CN | 112190013 A | 1/2021 |
| CN | 112401521 A | 2/2021 |
| CN | 112401523 A | 2/2021 |
| CN | 112641219 A | 4/2021 |
| CN | 112806783 A | 5/2021 |
| CN | 112932097 A | 6/2021 |
| CN | 113367487 A | 9/2021 |

(56)       References Cited

FOREIGN PATENT DOCUMENTS

| CN | 114009955 | A  |   | 2/2022 | | |
|----|-----------|-----|---|--------|---|---|
| DE | 2936790 | A1 |   | 3/1980 | | |
| DE | 102012101421 | A1 | * | 8/2013 | .............. | A47F 1/12 |
| DE | 202014102616 | U1 | * | 10/2015 | .............. | A47F 1/12 |
| EP | 2944228 | A1 | * | 11/2015 | .............. | A47F 1/12 |
| EP | 3324794 | B1 |   | 1/2020 | | |
| EP | 3053488 | B1 |   | 9/2020 | | |
| FR | 3032872 | B1 | * | 9/2017 | | |
| WO | WO-9930597 | A1 | * | 6/1999 | .............. | A47F 1/12 |
| WO | 2015154067 | A1 |   | 10/2015 | | |

* cited by examiner

SELECTIVELY SECURABLE ROLLER TRACK

CROSS REFERENCE TO RELATED APPLICATIONS

This application claims priority under 35 U.S.C. § 119(e) to U.S. Provisional Application 63/483,077, filed on Feb. 3, 2023. The disclosure of this prior application is considered part of the disclosure of this application and is hereby incorporated by reference in its entirety.

FIELD

The present disclosure relates generally to a selectively securable roller track for merchandise display systems.

BACKGROUND

This section provides background information related to the present disclosure and is not necessarily prior art.

In self-service retail establishments, such as drug stores, grocery stores and the like, articles of merchandise are often displayed for sale on racks including one or more vertically spaced shelves. To ensure that product inventory is always front-facing and available for customers to retrieve from the shelves, retailers may implement various feed systems on the racks to bias inventory towards a front edge of a shelf. However, known feed systems are typically provided in fixed configurations and are not capable of being easily modified to accommodate different types or arrangements of merchandise on the shelf. Accordingly, there exists a need for a merchandising system that can be easily adapted by a retailer to feed merchandise to a front edge of a shelf.

SUMMARY

An aspect of the disclosure provides a merchandise system for a retail shelf including a front rail defining a channel extending along a first direction. The system includes a roller track configured to selectively engage the front rail and operable to translate along the front rail in the first direction, the roller track including a frame selectively engaged with the front rail and a plurality of rollers attached to the frame.

Aspects of the disclosure may include one or more of the following optional features. In some examples, the roller track further includes a rail coupler configured to selectively engage with the front rail. Optionally, the rail coupler includes a front lip, a bearing element, and a catch, the front lip configured to selectively engage the front rail when the roller track is engaged with the front rail. In some implementations, the bearing element is spaced apart from the catch by a slot. In some configurations, the rail coupler includes a main body having an opening formed through a thickness of the main body along the slot.

In some implementations, the system includes a stop lens configured to selectively engage the roller track. In some configurations, the roller track further includes a first cutout and a second cutout configured to receive the stop lens. In some implementations, the roller track is configured to slidably engage the channel of the front rail. In some examples, the system includes a first divider and a second divider, wherein the roller track is disposed between the first divider and the second divider. In some implementations, the roller track includes a bearing element spaced apart from a catch to define a slot, the slot configured to selectively receive a portion of the front rail.

Another aspect of the disclosure provides a merchandise system for a retail shelf. The system includes a front rail defining a channel extending along a first direction and a roller track configured to slidably engage the front rail and operable to translate along the front rail in the first direction, the roller track including a frame selectively engaged with the front rail and a plurality of rollers attached to the frame.

Aspects of the disclosure may include one or more of the following optional features. In some examples, the roller track further includes a rail coupler configured to selectively engage with the front rail. In some implementations, the rail coupler includes a front lip, a bearing element, and a catch, the front lip configured to selectively engage with the front rail when the roller track is engaged with the front rail. Optionally, the bearing element is spaced apart from the catch by a slot. In some examples, the rail coupler includes a main body having an opening formed through a thickness of the main body along the slot.

In some implementations, the system includes a stop lens configured to selectively engage the roller track. Optionally, the roller track further includes a first cutout and a second cutout configured to receive the stop lens.

In some examples, the roller track is configured to slidably engage the channel of the front rail. In some implementations, the system includes a first divider and a second divider, wherein the roller track is disposed between the first divider and the second divider. In some examples, the roller track includes a bearing element spaced apart from a catch to define a slot, the slot configured to selectively receive a portion of the front rail.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
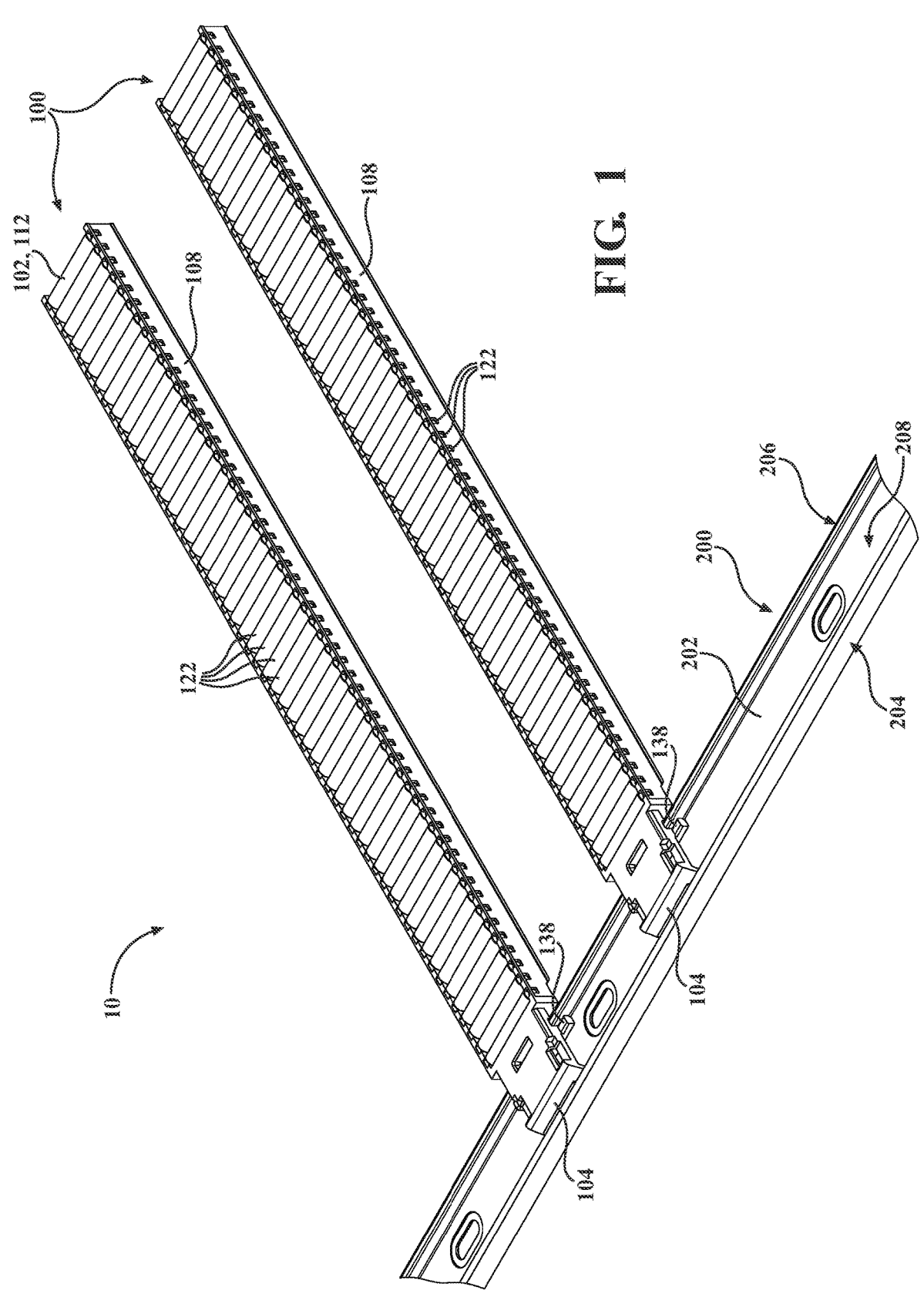
FIG. 1 is a perspective view of a merchandise system for a retail shelf or other surface according to an example of the present disclosure.
Figure 2:
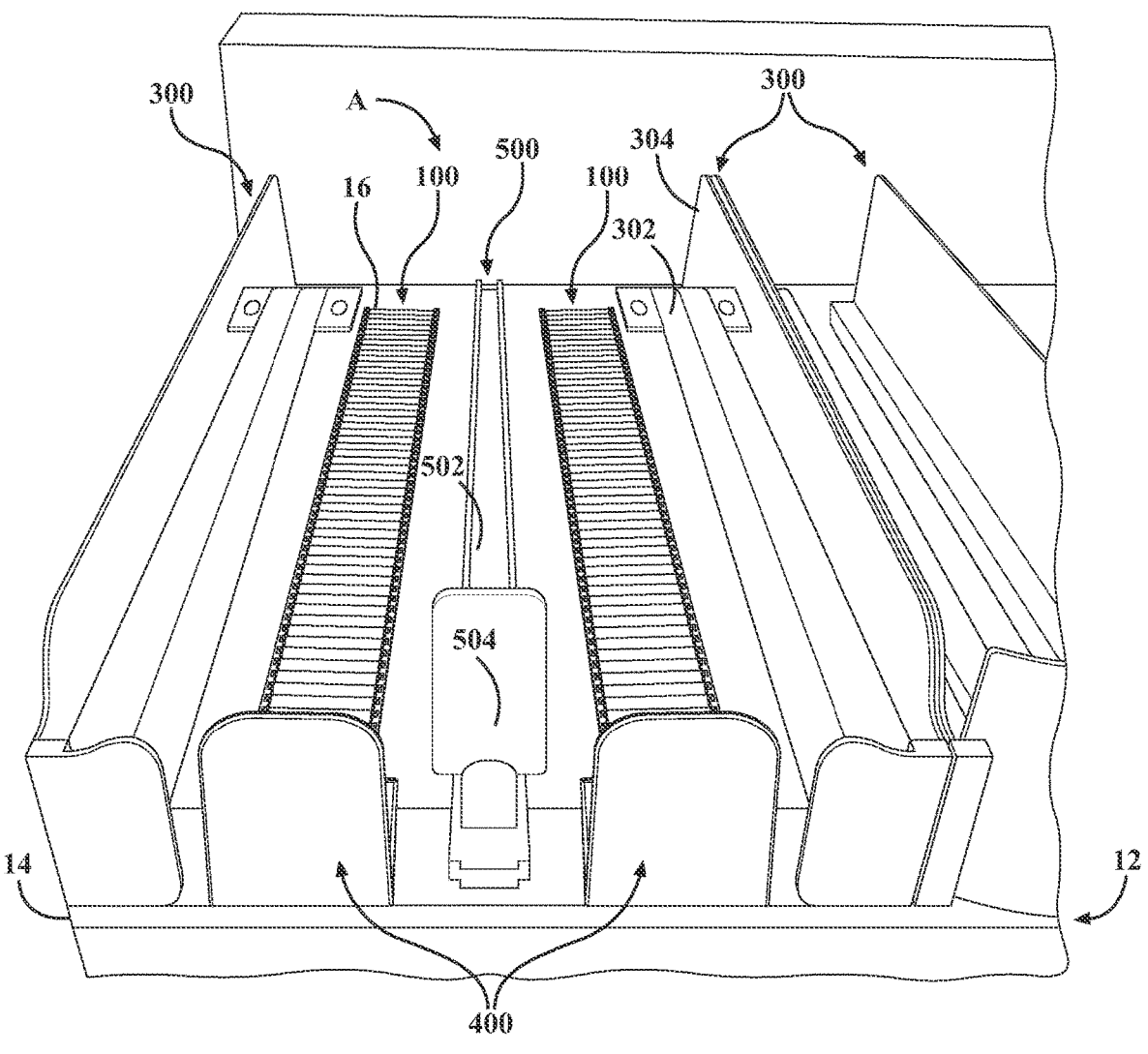
FIG. 2 is a front perspective view of the merchandise system of FIG. 1, whereby the merchandise system is installed on a retail shelf.

Referring to FIGS. 1 and 2, a merchandise system 10 is generally shown. The merchandise system 10 may be installed on a top surface of a shelf 12, or other suitable base surface. The shelf 12 may be located in a store or other suitable location where consumers are able to purchase merchandise. As shown in FIG. 2, a length of the shelf 12 extends from a front edge 14 to an opposite rear edge 16. Generally, the front edge 14 is configured to face an aisle or customer area of a retail environment, while the rear edge 16 is configured to face towards a wall or mounting portion of the merchandise system. As discussed throughout, the direction from the front edge 14 to the rear edge 16 defines a longitudinal direction while the direction parallel to the front edge 14 and the rear edge 16 defines a lateral direction of the shelf 12. In some implementations, the shelf 12 may include a shelf panel including a plurality of apertures extending through a thickness of the shelf panel 13 and arranged in series adjacent to each of the front edge 14 and/or the rear edge 16 of the shelf 12. Portions of the merchandise system 10 may be secured to the shelf 12 via fasteners (e.g., pins) engaged with the apertures. The merchandise system 10 may be secured to the shelf 12 in any suitable manner, and the merchandise system 10 may be selectively detached from the shelf 12 and moved, for example, to another shelf or other surface.

Referring to FIGS. 1 and 2, the merchandise system 10 includes one or more roller tracks 100, a front rail 200, one or more dividers 300, one or more stop lenses 400, and optionally, one or more pushers 500. With the merchandise system 10 installed on a shelf 12, any suitable merchandise may be positioned within a product receiving area A defined by the roller track 100, adjacent ones of the dividers 300, and the stop lens 400. The roller tracks 100 are selectively positionable along the front rail 200 and are configured to receive the stop lenses 400 at a first end of the product receiving area A between adjacent dividers 300 to retain merchandise on the shelf 12 until removed by a customer.

Figure 19:
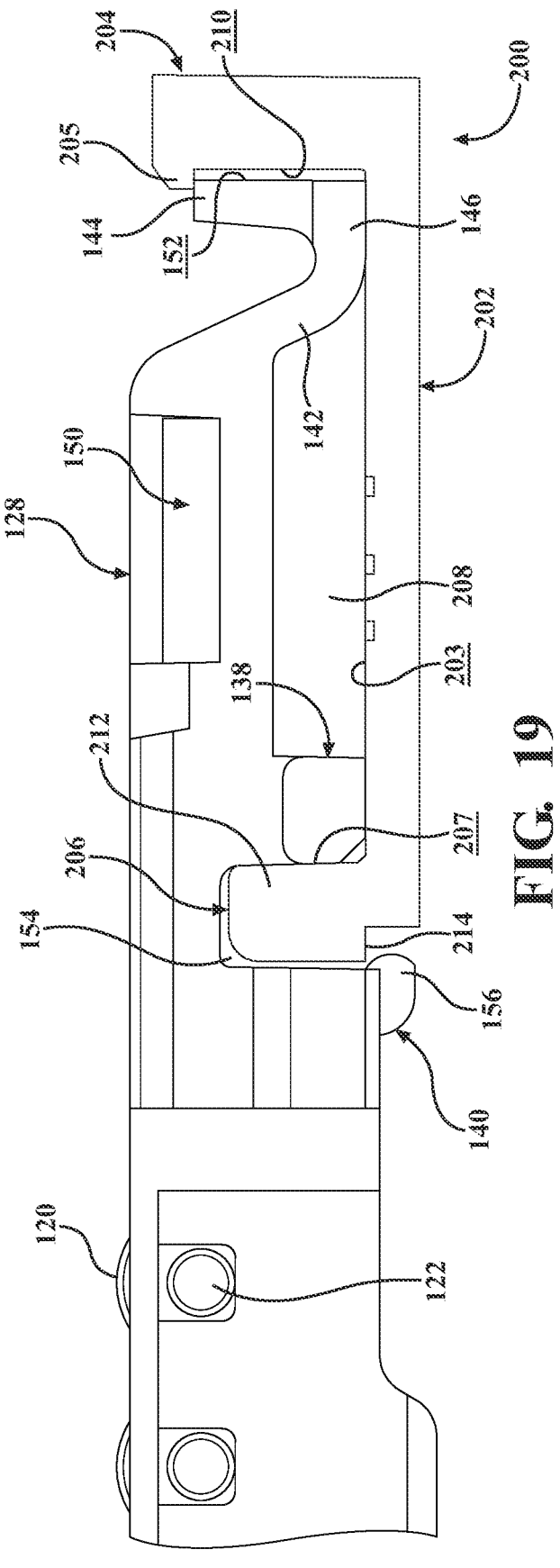
FIG. 19 is a partial side view of the rail coupler of FIG. 18 engaged with a front rail according to an example of the present disclosure.

In the illustrated example, the merchandise system 10 includes a pair of roller tracks 100 and a front rail 200. The front rail 200 includes a bottom wall 202, a front wall 204, and a rear wall 206. When the front rail 200 is installed on the shelf 12, the front wall 204 is closer to the front edge 14 of the shelf 12 (i.e., the customer's vantage point) than the rear wall 206. With reference to FIG. 19, the bottom wall 202, the front wall 204, and the rear wall 206 cooperate to define an elongate channel 208 that extends continuously along the lateral direction of the shelf 12 and provides a sliding engagement interface for each roller track 100 and the one or more dividers 300. As best shown in FIG. 19, the front wall 204 extends from the bottom wall 202 to a distal end including a retaining flange 205 that extends towards the rear wall 206. The front wall further includes a front engagement surface 210 extending between the retaining flange 205 and the bottom wall 202, whereby the retaining flange 205, the front engagement surface 210, and the bottom wall 202 cooperate to define a space for receiving and retaining a portion of the roller track 100 within the front rail 200, as discussed below. The rear wall 206 extends from the bottom wall 202 to a distal end 212 and forms a rear wall lip 214 that is configured to interface with a catch or flange 140 of the roller track 100 when the merchandise system 10 is assembled. In the illustrated example, the rear wall lip 214 is defined by a notch formed at an intersection of the bottom wall 202 and the rear wall 206, whereby the rear wall lip 214 is formed along a bottom edge of the rear wall 206. As shown in FIG. 19, the rear wall lip 214 faces rearwardly (i.e., away from the front wall 204). While the rear wall lip 214 is illustrated as being a horizontal surface, the rear wall lip 214 may be formed as an undercut feature extending along the length of the rear wall 206. In other words, the rear wall lip 214 may extend at an oblique angle relative to the bottom wall 202.

Figure 8:
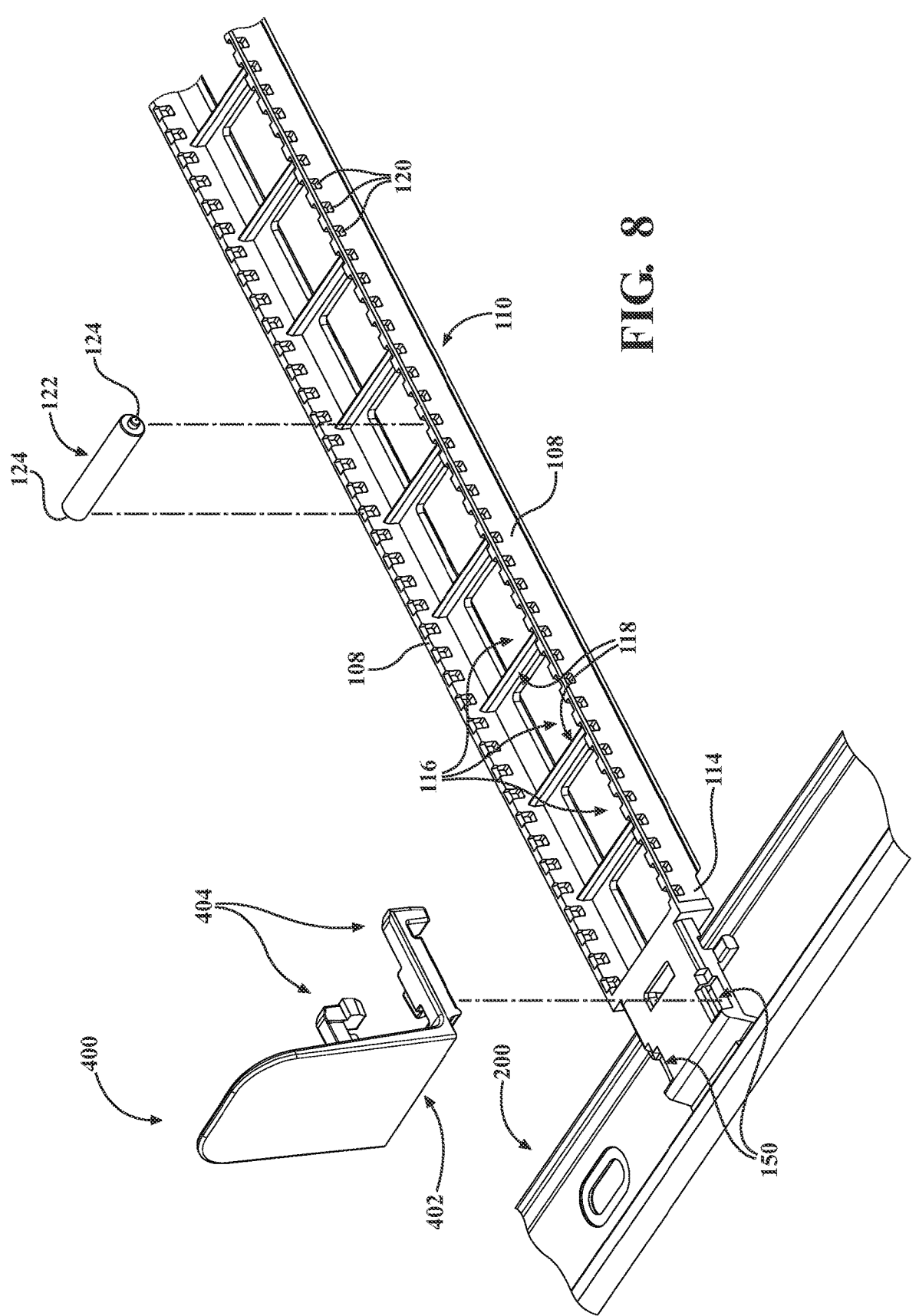
FIG. 8 is an exploded perspective view of the roller track and stop lens of the merchandise system of FIG. 1.
Figures 9, 10, 11:
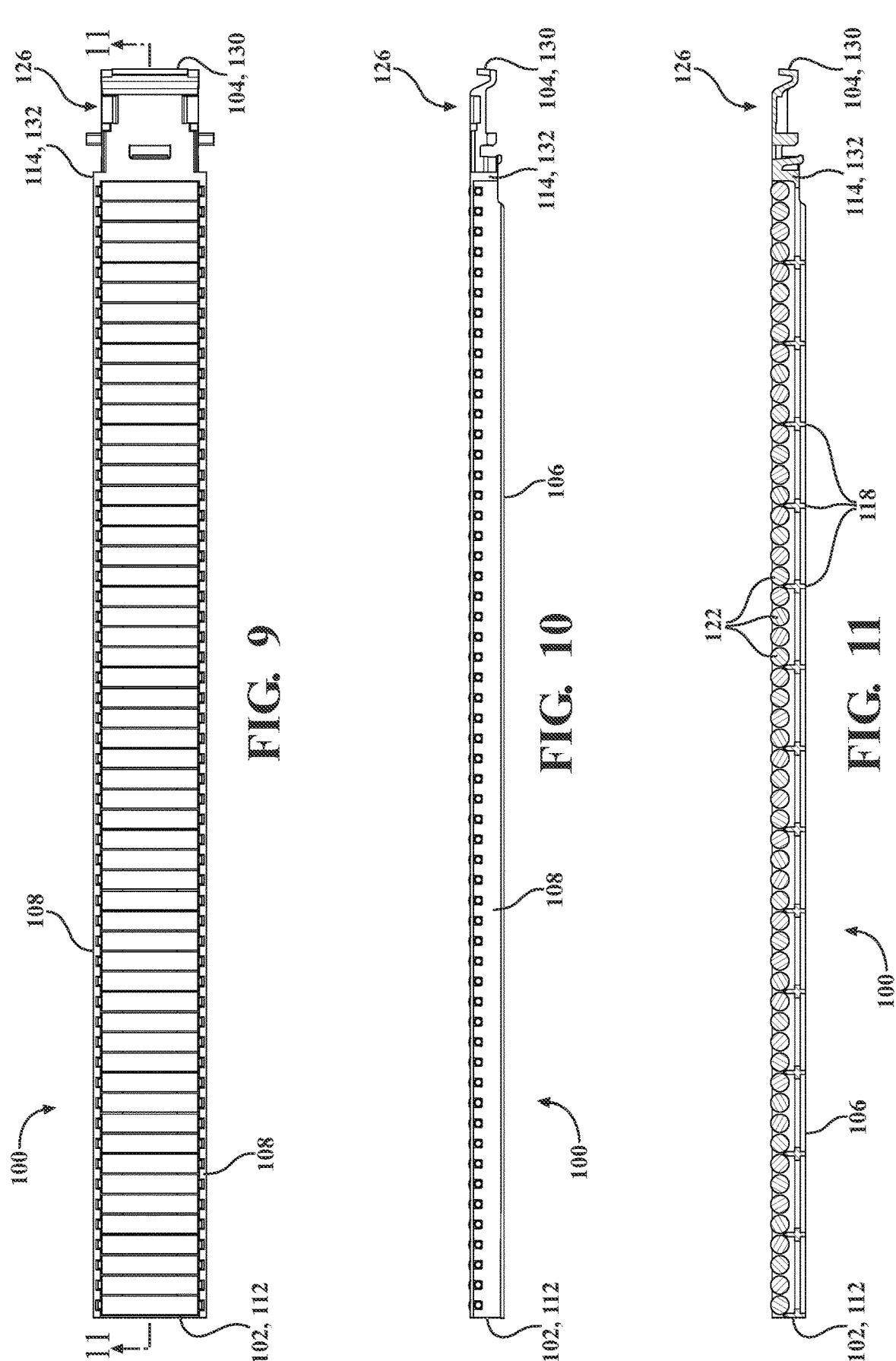
FIG. 9 is a top plan view of the roller track of the merchandise system of FIG. 1.
FIG. 10 is a side view of the roller track FIG. 9.
FIG. 11 is a cross-sectional view of the roller track taken along Line 11-11 of FIG. 9.
Figures 12, 13, 14:
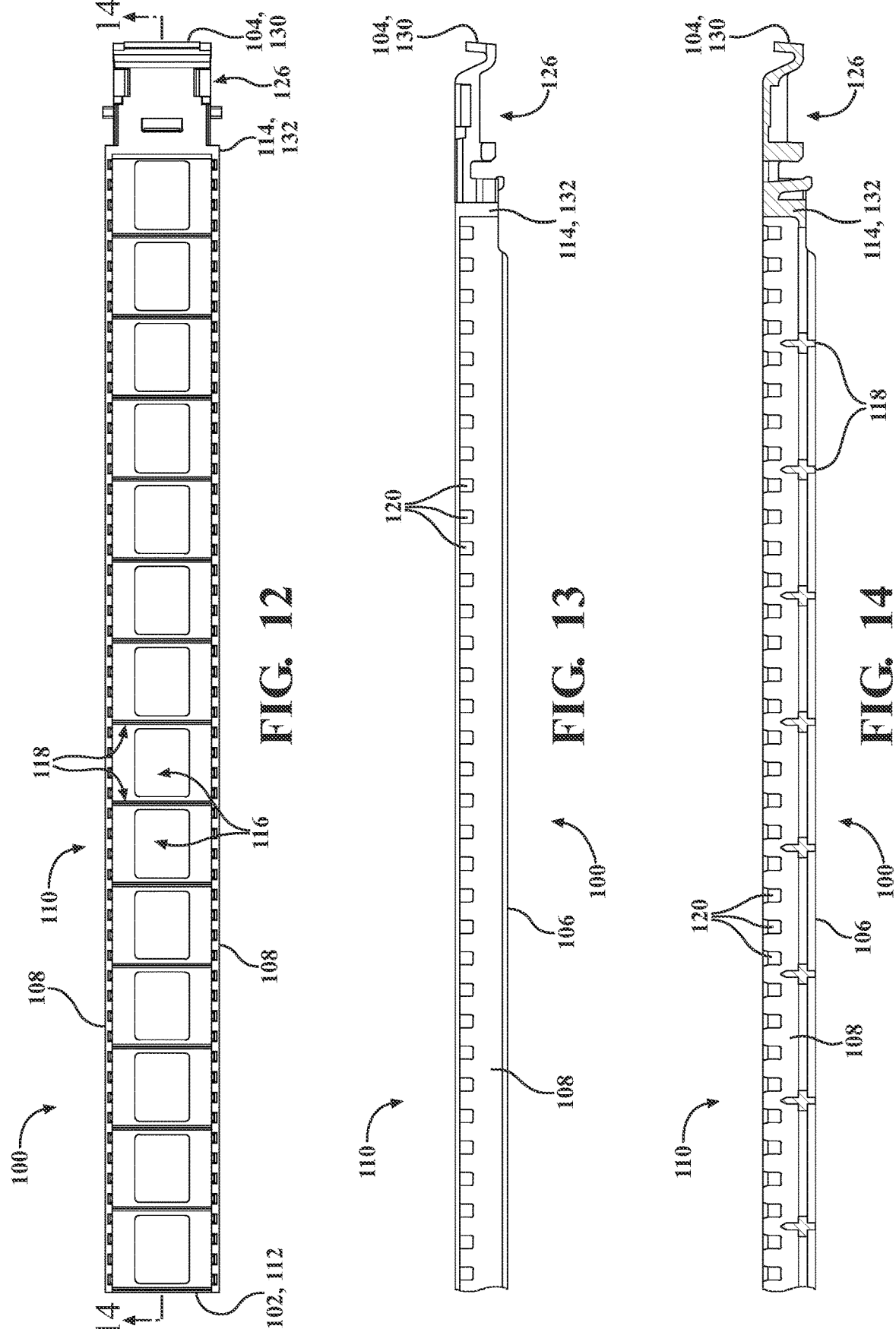
FIG. 12 is a top plan view of a frame and an rail coupler of the roller track of FIG. 9.
FIG. 13 is a side view of the frame and the rail coupler of the roller track of FIG. 12.
FIG. 14 is a cross-sectional view of the frame and the interface element of the roller track taken along Line 14-14 in FIG. 12.
Figure 15:
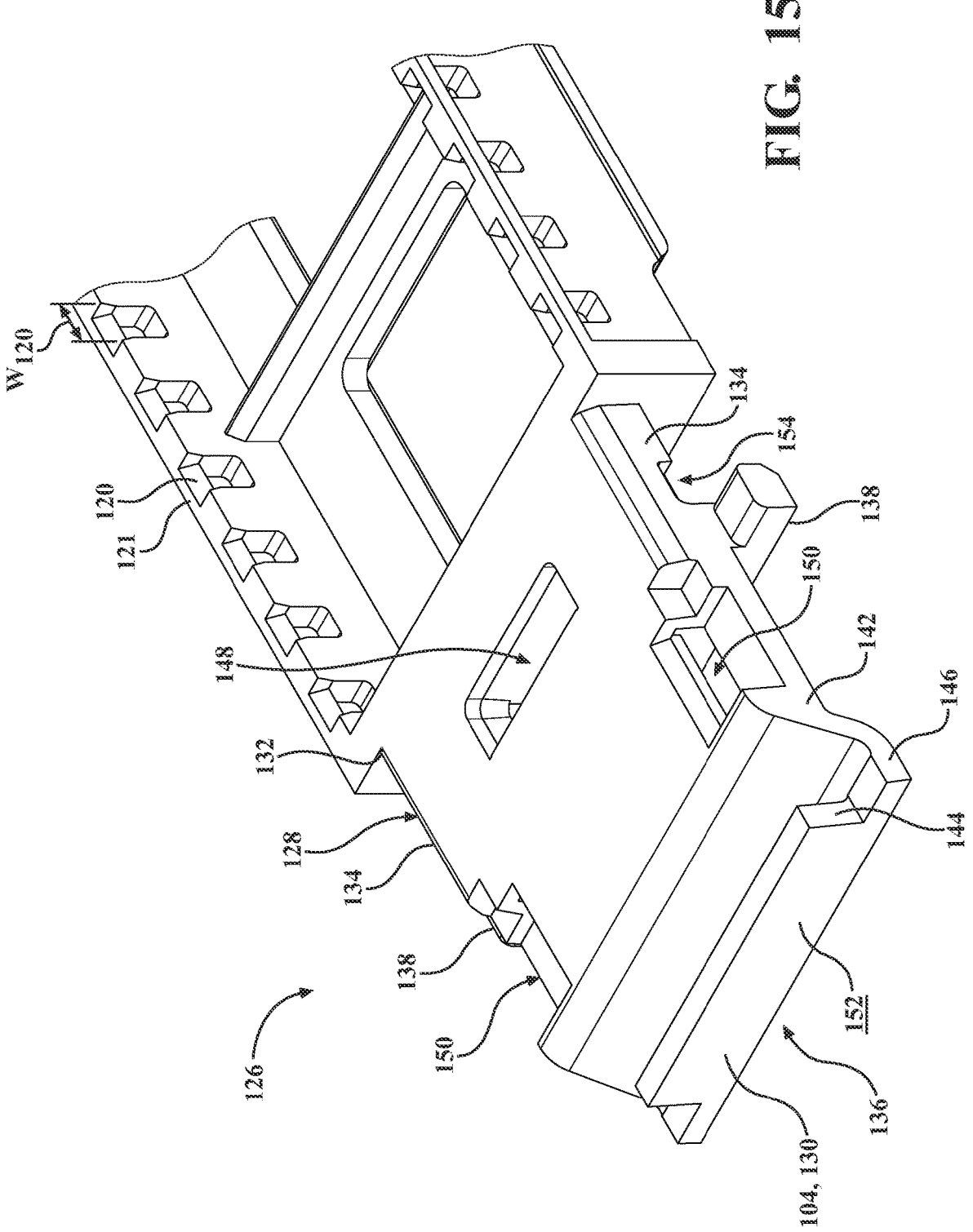
FIG. 15 is a top perspective view of the rail coupler of the roller track of FIG. 9.

Each roller track 100 includes a first end 102, a second end 104 disposed on an opposite end of the roller track 100 than the first end 102, and a roller base 106 extending between the first end 102 and the second end 104. As best shown in FIGS. 8 and 12, a width of the roller base 106 is defined by a pair of parallel sidewalls 108 that are laterally spaced apart from each other and extend from the first end 102 to the second end 104. The first end 102, the second end 104, the roller base 106, and the sidewalls 108 cooperate to form a roller frame 110 for receiving a plurality of rollers 122. The roller frame 110 extends from a first end 112 disposed at the first end 102 of the roller track 100 along a longitudinal direction to a second end 114 adjacent to the second end 104 of the roller track 100.

Referring to FIGS. 8-14, in some implementations a plurality of apertures 116 extend through a thickness of the roller base 106 and are arranged in series between the first end 112 of the frame 110 and the second end 114 of the frame 110. Additionally, a plurality of ribs 118 may be arranged in series along the roller base 106, where each rib 118 extends between the sidewalls 108 of the frame 110 and separates adjacent apertures 116. The frame 110 may further include a plurality of receptacles 120 arranged in series along an upper edge of each of the sidewalls 108. The rollers

122 may each include a pair of axles 124 disposed on each end of the roller 122, where the axles 124 are configured to be selectively engaged with the receptacles 120 of the sidewalls 108 to position the rollers 122 within the frame 110 of the roller track 100. For example, the receptacles 120 may have a size $W_{120}$ (e.g., width, diameter) that is larger than a size (e.g., width, diameter) of the axles 124 to allow the axles to drop into the receptacles 120. Optionally, the receptacles 120 may include a retainer 121 that extends across an opening of the receptacle 120 to provide a snap fit function between the receptacles 120 of the frame 110 and the rollers 122 that are inserted into the frame 110. When the merchandise system 10 is assembled, the merchandise may be placed on the rollers 122, such that the rollers 122 operate to roll (i.e., convey) the remaining merchandise forward as merchandise is taken from the shelf 12.

As best shown in FIGS. 15-18, the roller track 100 further includes a rail coupler 126 attached to the second end 114 of the frame 110 at the second end 104 of the roller track 100. A length of the rail coupler 126 extends from a first end 130 disposed at the second end 104 of the roller track 100 to a second end 132 disposed at the second end 114 of the frame 110. Optionally, the rail coupler 126 includes a pair of sidewalls 134 extending between the first end 130 and the second end 132. The rail coupler 126 of the roller track 100 may further include a front lip 136 spaced apart from a bearing element 138 and a catch 140 by a main body 128. The front lip 136 is disposed at the first end 130 of the rail coupler 126, while the bearing element 138 and the catch 140 are disposed at the second end 132 of the rail coupler 126. The front lip 136 may further be defined by a first portion 142, a second portion 144, and a third portion 146. The first portion 142 of the front lip 136 extends from the main body 128 of the rail coupler 126 and is spaced apart from and opposes the second portion 144. Here, the third portion 146 may be disposed between and connect the first portion 142 and the second portion 144 such that the first portion 142 and the second portion 144 diverge as they extend away from the third portion 146. Thus, the third portion 146 allows the front lip 136, and particularly the second portion 144 thereof, to flex relative to the main body 128 during engagement of the rail coupler 126 with the front rail 200. The second portion 144 includes a second engagement surface 152 that opposes the engagement surface 210 of the front rail 200 in an interference fit when the roller track 100 is engaged with the front rail 200.

Figure 16:
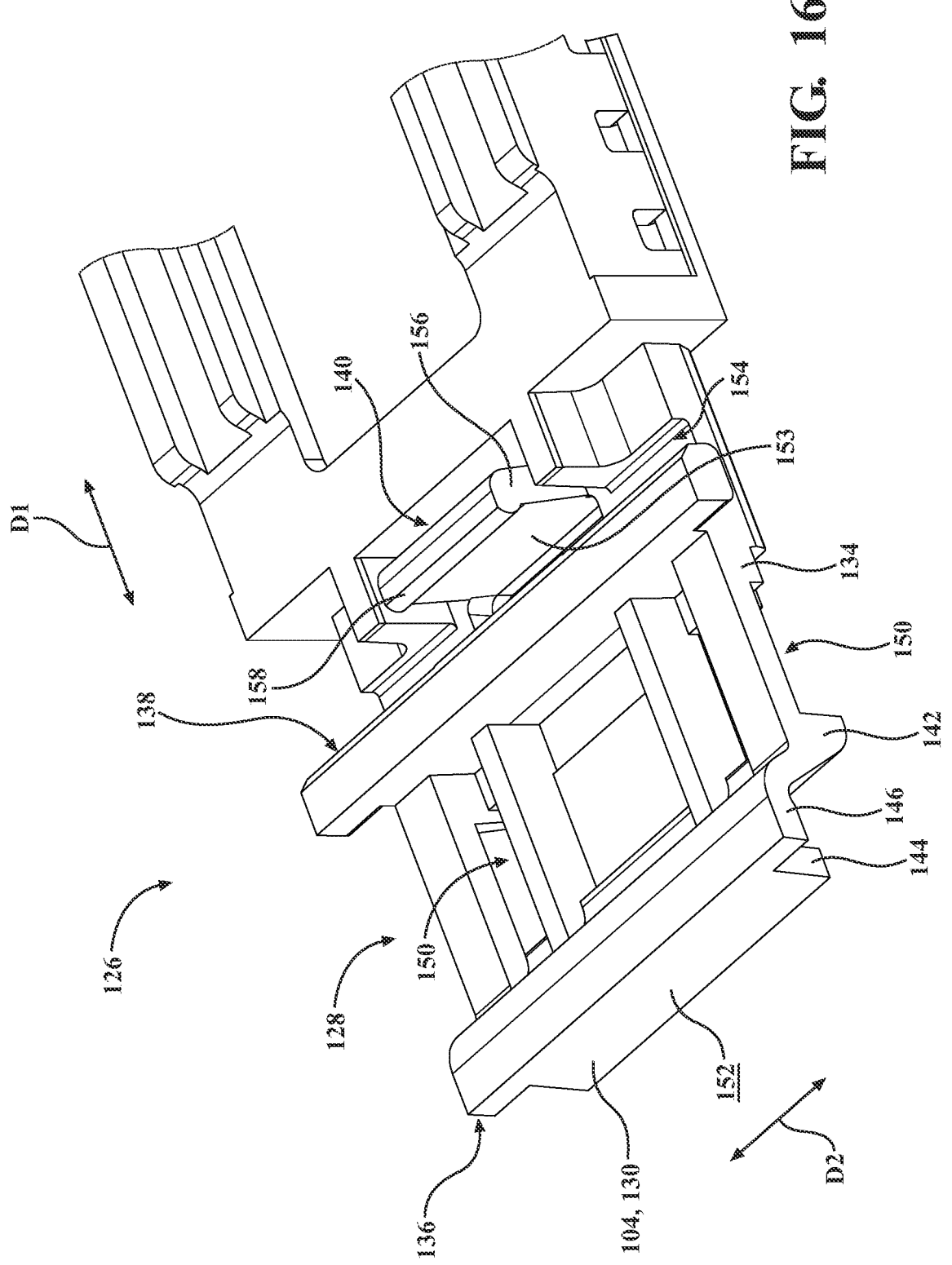
FIG. 16 is a bottom perspective view of the rail coupler of the roller track of FIG. 9.
Figures 17, 18:
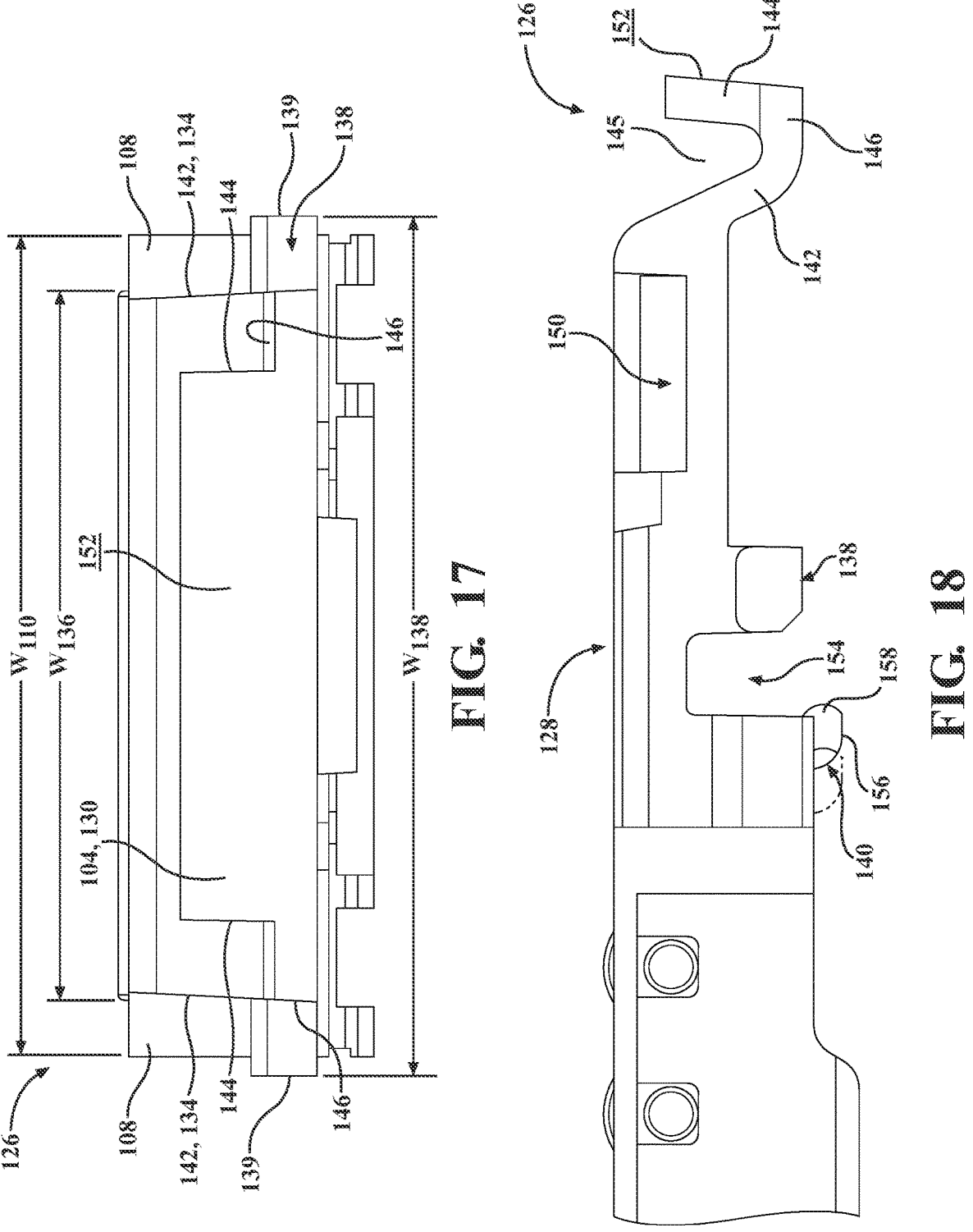
FIG. 17 is a front view of the rail coupler of the roller track of FIG. 9.
FIG. 18 is a side view of the rail coupler of the roller track of FIG. 9.

The bearing element 138 of the rail coupler 126 includes an elongate member extending along a bottom side of the main body 128 in the lateral direction. As best shown in FIGS. 16 and 17, a width $W_{138}$ of the bearing element 138 is defined between opposite ends 139, which may extend beyond the main body 128 of the rail coupler 126 and a width $W_{110}$ of the frame 110 to maximize engagement between rail coupler 126 and the front rail 200 when assembled. Specifically, when the merchandise system 10 is assembled, the bearing element 138 may oppose or interface with inner surfaces 203, 207 of the rear wall 206 and the bottom wall 202 of the front rail 200 and provide additional stability to prevent the roller track 100 from rotating or tipping within the channel 208 of the front rail 200. In other words, the bearing element 138 is configured to contact corresponding surfaces of the front rail 200 and minimize splaying of the roller tracks 100 when lateral forces are applied, either during repositioning of the roller track 100 or when merchandise is loaded onto the roller track 100. As best shown in FIG. 18, the bearing element 138 includes a generally rectangular cross-sectional profile extending between the ends 139. Optionally, an edge of the bearing element 138 between the bottom surface of the bearing element 138 and the rear surface of the bearing element 138 may be chamfered to maximize surface contact between the bearing surfaces of the bearing element 138 and the support surfaces 203, 207 of the front rail 200

As best shown in FIGS. 18 and 19, the main body 128 of the rail coupler 126 includes a guide slot 154 extending continuously across a width of the main body 128b between the bearing element 138 and the catch 140. The guide slot 154 is configured to selectively receive a portion of the rear wall 206 of the front rail 200 between the catch 140 and the bearing element 138, providing a sliding interface between the front rail 200 and the roller track 100.

The catch 140 is disposed along a bottom side of the main body 128 and projects at least partially into the guide slot 154. In the illustrated example, the catch 140 includes an arm 153 extending from a proximal end attached to the bottom side of the main body 128 to a distal end 156 configured to selectively engage the front rail 200. The distal end 156 of the catch 140 may have protuberance 158 defining a projecting or bulbous profile configured to engage the rear wall lip 214 when the front rail 200 is engaged with the slot 154. As discussed below, the distal end 156 of the catch 140 is operable to move along the longitudinal direction DI between an engaged first position in a resting state (shown in FIG. 16) and a disengaged second position in a biased state. Particularly, the distal end 156 of the catch 140 may be moved to the first position to engage the distal end 156 with the rear wall lip 214 and to the second position to disengage or retract the distal end 156 from the rear wall lip 214. The bulbous or semi-cylindrical profile of the protuberance 158 defines radiused upper and lower surfaces at a forward-facing of the distal end 156, whereby the convex surfaces function to bias the catch 140 toward the second position as the distal end 156 passes along the rear wall 206. Thus, the catch 140 can be disengaged from the rear wall lip 214 by lifting the frame 110 upward such that the rear wall lip 214 biases the catch 140 toward the second position and allows the rail coupler 126 to detach from the rear wall 206.

The rail coupler 126 of the roller track 100 may further include a window 148 formed through a thickness of the main body 128 such that rear wall 206 of the front rail 200 is visible and accessible through the window 148 when the roller track 100 is positioned in the channel 208 of the front rail 200. In other words, the window 148 may facilitate proper positioning of the roller track 100 within the front rail 200 by providing a visual indicator that the roller track 100 is in position to engage the rear wall 206 of the front rail 200. The rail coupler 126 may also include a pair of sockets 150, where each socket 150 is formed in a respective sidewall 134 of the rail coupler 126. As will be described in more detail below, the sockets 150 are configured to receive the stop lens 400 when the stop lens 400 engages the roller track 100.

Figure 3:
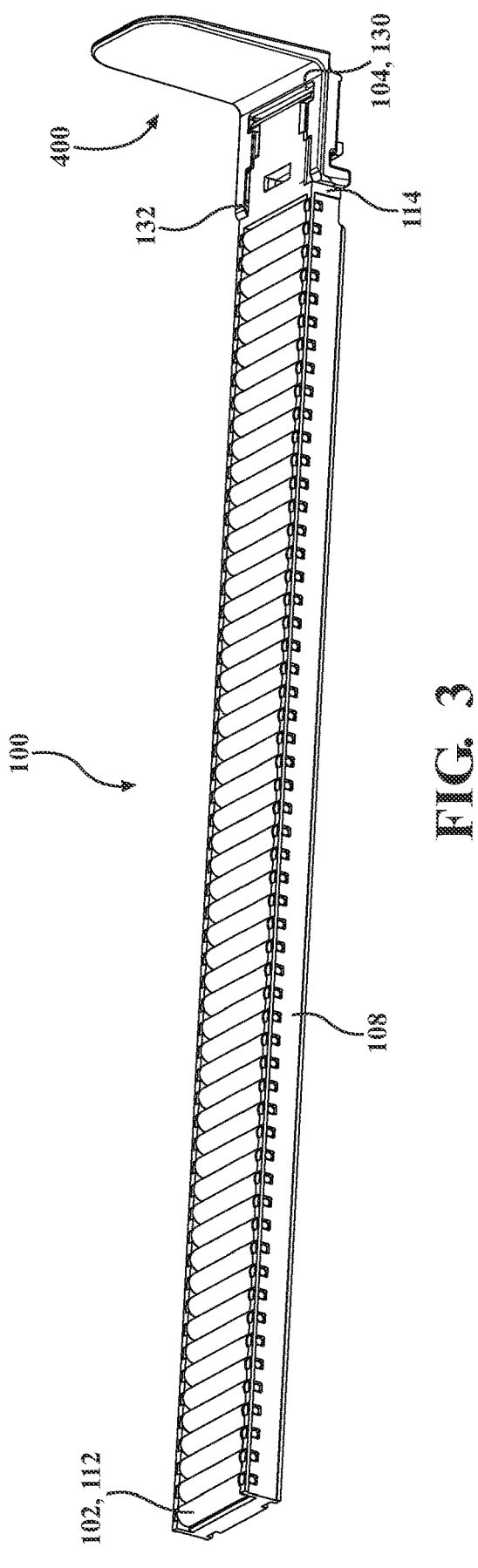
FIG. 3 is a side perspective view of a roller track and a stop lens of the merchandise system of FIG. 1.
Figure 4:
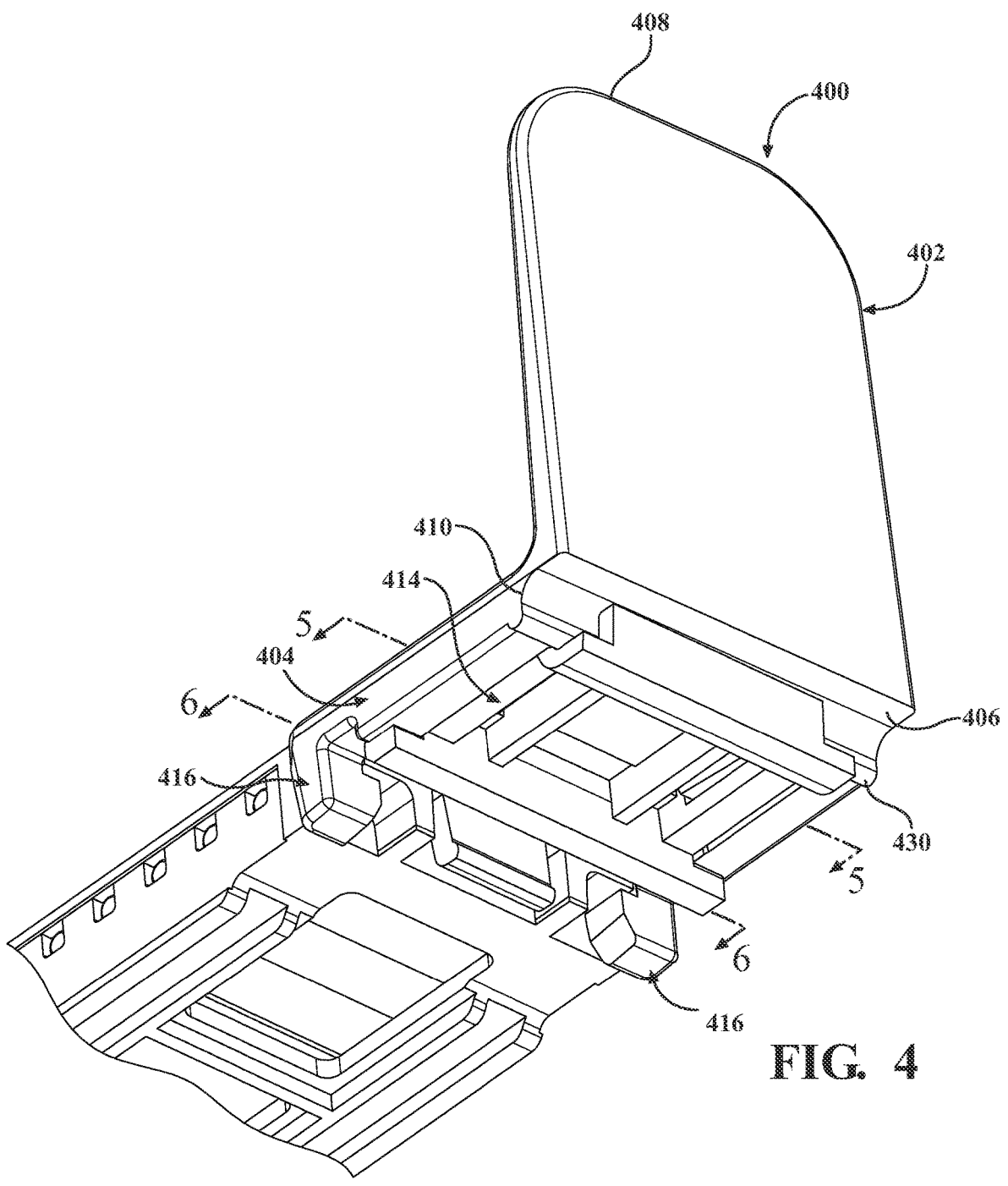
FIG. 4 is an enlarged, partial, bottom perspective view of the roller track of FIG. 3.

Optionally, the merchandise system 10 may include a stop lens 400 configured to selectively engage the roller track 100. With particular reference to FIGS. 2-4, the stop lens 400 may include a front panel 402 and a pair of engagement arms 404 disposed on opposite sides of the front panel 402 of the stop lens 400. Advantageously, the stop lens 400, or at least the front panel 402 thereof, may be formed from a clear material so that the merchandise is visible behind the stop lens 400.

Figure 5:
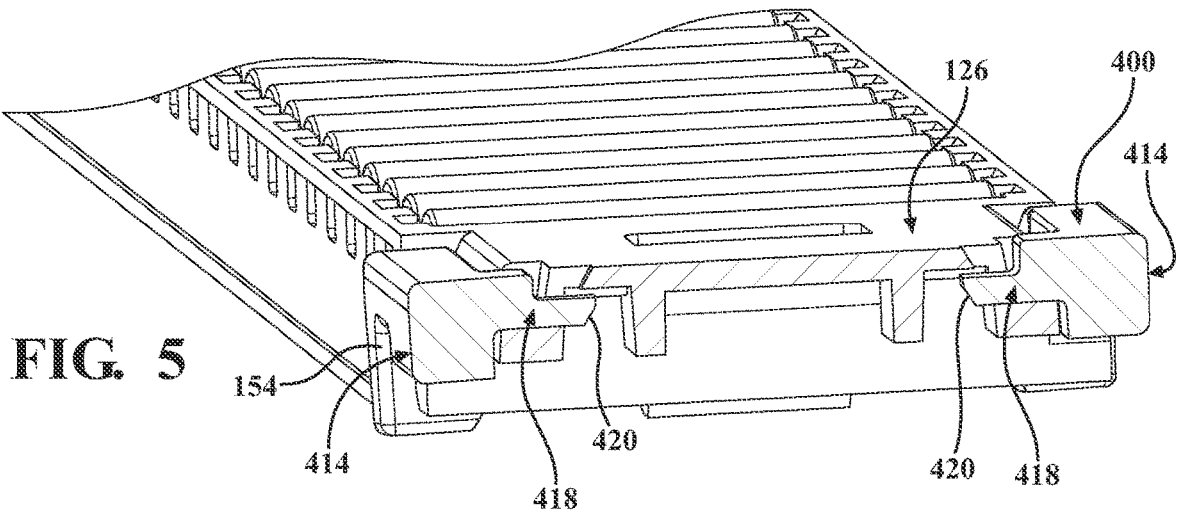
FIG. 5 is a front perspective cross-sectional view of the roller track of FIG. 3, taken along Line 5-5 of FIG. 4.
Figure 6:
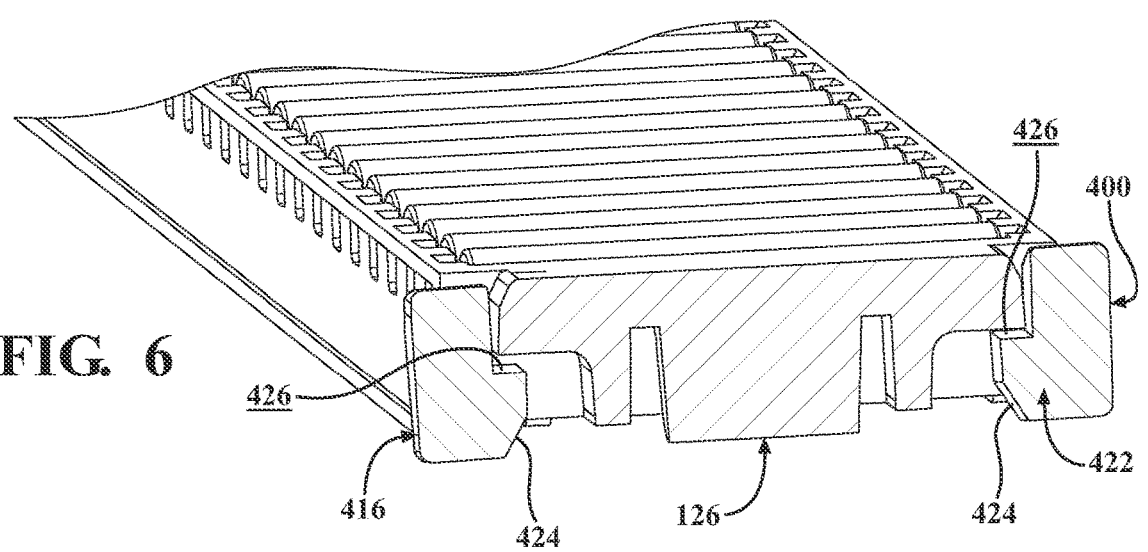
FIG. 6 is a front perspective cross-sectional view of the roller track of FIG. 3, taken along Line 6-6 of FIG. 4.
Figure 7:
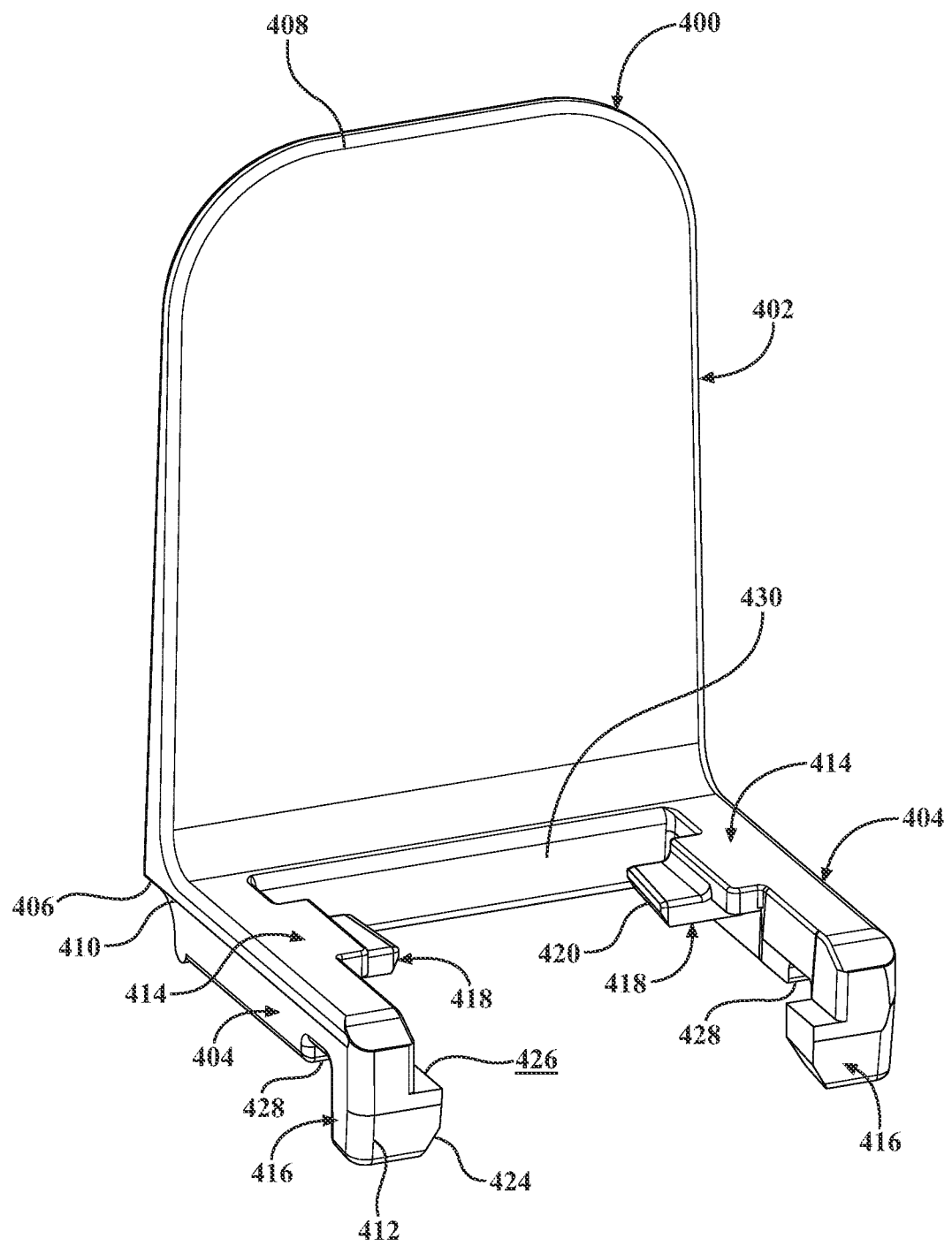
FIG. 7 is a perspective view of the stop lens of the roller track of FIG. 3.

As shown, the front panel 402 of the stop lens 400 has a height that extends from a bottom edge 406 to a distal upper edge 408 that defines an overall height $H_{400}$ of the stop lens 400. The height $H_{400}$ is selected to accommodate different combinations of shelf spacing and product sizes. The engagement arms 404 each extend from a proximal end 410 attached at the bottom edge 406 of the front panel 402 to a distal end 412. As shown in FIGS. 4-7, each engagement arm 404 includes an intermediate engagement tab 414 disposed between the proximal end 410 and the distal end 412 and a distal engagement tab 416 disposed at the distal end 412. Referring to FIGS. 4-7, the intermediate engagement tab 414 is configured to interface with one of the sockets 150 of the rail coupler 126. Particularly, a bottom distal end of each intermediate engagement tab 414 includes a lower finger 418 that is offset or recessed from a top side of the engagement arm 404 and configured to mate with the socket 150 of the rail coupler 126. As shown in FIG. 5, distal ends of the fingers 418 may include a lower bevel 420 to facilitate a snap-fit when the stop lens 400 is pressed downwardly onto the rail coupler 126, whereby the beveled ends cause the fingers 418 to bias upwardly as they pass around the main body 128 of the rail coupler 126.

Referring still to FIGS. 4-7, the distal engagement tabs 416 each include a barbed configuration defined by distal fingers 422. As best shown in FIGS. 3C and 3D, the bottom-inner edge of each distal finger 422 includes a bevel 424 for biasing the distal fingers 422 around the main body 128. Further, the distal fingers 422 each include an upper retainer surface 426 configured to engage a bottom side of the main body 128 between the guide slot 154 and the second end 132 of the rail coupler 126. Thus, the engagement arms 404 each attach to the rail coupler 126 at the intermediate engagement tabs 414 and the distal engagement tabs. With continued reference to FIGS. 4-7, the stop lens 400 may include one or more tracking elements 428, 430 for engaging and aligning the stop lens 400 with the rail coupler 126. For example, the stop lens 400 includes a pair of guide notches 428 (FIG. 7) that align with the guide slot 154 of the rail coupler 126 when the stop lens 400 is fully engaged with the rail coupler 126. Additionally, the stop lens 400 includes a guide rib 430 extending across a width of the stop lens 400 beneath the front panel 402. The guide rib 430 is configured to be received within the channel 145 (FIG. 18) formed between the first portion 142 and the second portion 144 of the front lip 136.

In operation, the merchandise system 10 may be installed on a shelf 12 at a place of commerce. The roller track 100 may be inserted into the front rail 200 via a user exerting a force on the rail coupler 126 such that the second portion 144 of the front lip 136 of the rail coupler 126 is received against the engagement surface 210 of the front rail 200, within the space between the retaining flange 205 and the bottom wall 202. The rear wall 206 of the front rail 200 biases the distal end 156 of the catch 140 rearwardly until the rear wall 206 is positioned fully within the guide slot 154. The distal end 156 of the catch 140 may spring back to the first position when the rear wall 206 is positioned within the slot 154 such that that the distal end 156 engages the rear wall lip 214 to maintain the rear wall 206 within the slot 154 during assembly. Once the roller track 100 is fully engaged with the front rail 200, the roller track 100 may be slid along the front rail 200 via a user exerting a lateral force on the roller track 100.

Optionally, the merchandise system 10 may be configured with any combination of the roller track 100, the dividers 300, and/or the pushers 500 to define the product receiving areas A. The dividers 300 may include conventional dividers having a divider base 302 that slidably engages with the front rail 200 and a divider wall 304 that extends vertically from the base 302. The pusher 500 includes a center-push device having a pusher base 502 that slidably engages with the front rail 200 and a pusher paddle 504 coupled to the pusher base 502. The pusher paddle 504 is operable to travel along the lengthwise direction of the shelf 12 (i.e., from front to back) and to bias merchandise towards the front edge 14). As discussed below, the pusher base 502 may include a rail engagement mechanism (not shown) configured to selectively engage the front rail 200 to inhibit lateral movement of the pusher 500 along the front rail 200.

In the illustrated example, the roller track 100 and/or the dividers 300 are configured to freely slide along the front rail 200. The dividers 300 are also moveable along the front rail 200 to accommodate the desired size of items of merchandise in the merchandise system 10. In other words, the roller track 100 and the dividers 300 do not include a locking interface with the front rail 200 for securing a lateral position relative to the front rail 200. However, the dividers 300 and/or the pusher 500 may include a front locking mechanism, such as a clamp or retractable teeth that are configured to selectively engage the front rail 200 to prevent lateral movement or translation of the dividers 300 and/or pusher 500 relative to the front rail 200. Thus, the merchandise system 10 is configured to allow any number of roller tracks 100 to be easily installed and adjusted within a product receiving area A, whereby position of the roller tracks 100 is then secured by adjacent ones of the dividers 300 and/or pushers 500. Any of the roller track 100, the front rail 200, the divider 300, and the stop lens 400 may be formed of a known suitable plastic, such as a thermoplastic extrusion, or metal, such as an aluminum extrusion.

The terminology used herein is for describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed herein could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A merchandise system for a retail shelf including a front rail defining a channel extending along a first direction, the system comprising:
   a roller track configured to selectively engage the front rail and operable to translate along the front rail in the first direction, the roller track including:
      a frame selectively engaged with the front rail and a plurality of rollers attached to the frame; and
      a rail coupler having a main body and a front lip, the front lip defined by a first portion extending from the main body of the rail coupler, a second portion spaced apart and opposing the first portion, and a third portion extending between and connecting the first portion to the second portion, the first portion and the second portion diverging from one another as they extend away from the third portion.

2. The merchandise system of claim 1, wherein the rail coupler is configured to selectively engage with the front rail.

3. The merchandise system of claim 2, wherein the rail coupler further includes a bearing element and a catch, the front lip configured to selectively engage the front rail when the roller track is engaged with the front rail.

4. The merchandise system of claim 3, wherein the bearing element is spaced apart from the catch by a slot.

5. The merchandise system of claim 4, wherein the main body includes an opening formed through a thickness of the main body along the slot.

6. The merchandise system of claim 1, further comprising a stop lens configured to selectively engage the roller track.

7. The merchandise system of claim 6, wherein the roller track further includes a first cutout and a second cutout configured to receive the stop lens.

8. The merchandise system of claim 1, wherein the roller track is configured to slidably engage the channel of the front rail.

9. The merchandise system of claim 8, further comprising a first divider and a second divider, wherein the roller track is disposed between the first divider and the second divider.

10. The merchandise system of claim 1, wherein the roller track includes a bearing element spaced apart from a catch to define a slot, the slot configured to selectively receive a portion of the front rail.

11. A merchandise system for a retail shelf, the merchandise system comprising:
   a front rail defining a channel extending along a first direction; and
   a roller track configured to slidably engage the front rail and operable to translate along the front rail in the first direction, the roller track including:
      a frame selectively engaged with the front rail and a plurality of rollers attached to the frame; and
      a rail coupler having a main body and a front lip, the front lip defined by a first portion extending from the main body of the rail coupler, a second portion spaced apart and opposing the first portion, and a third portion extending between and connecting the first portion to the second portion, the first portion diverging from the second portion as it extends away from the third portion.

12. The merchandise system of claim 11, wherein the rail coupler is configured to selectively engage with the front rail.

13. The merchandise system of claim 12, wherein the rail coupler further includes a bearing element, and a catch, the front lip configured to selectively engage with the front rail when the roller track is engaged with the front rail.

14. The merchandise system of claim 13, wherein the bearing element is spaced apart from the catch by a slot.

15. The merchandise system of claim 14, wherein the main body includes an opening formed through a thickness of the main body along the slot.

16. The merchandise system of claim 11, further comprising a stop lens configured to selectively engage the roller track.

17. The merchandise system of claim 16, wherein the roller track further includes a first cutout and a second cutout configured to receive the stop lens.

18. The merchandise system of claim 11, wherein the roller track is configured to slidably engage the channel of the front rail.

19. The merchandise system of claim 18, further comprising a first divider and a second divider, wherein the roller track is disposed between the first divider and the second divider.

20. The merchandise system of claim 11, wherein the roller track includes a bearing element spaced apart from a catch to define a slot, the slot configured to selectively receive a portion of the front rail.

* * * * *